Patented Sept. 1, 1942

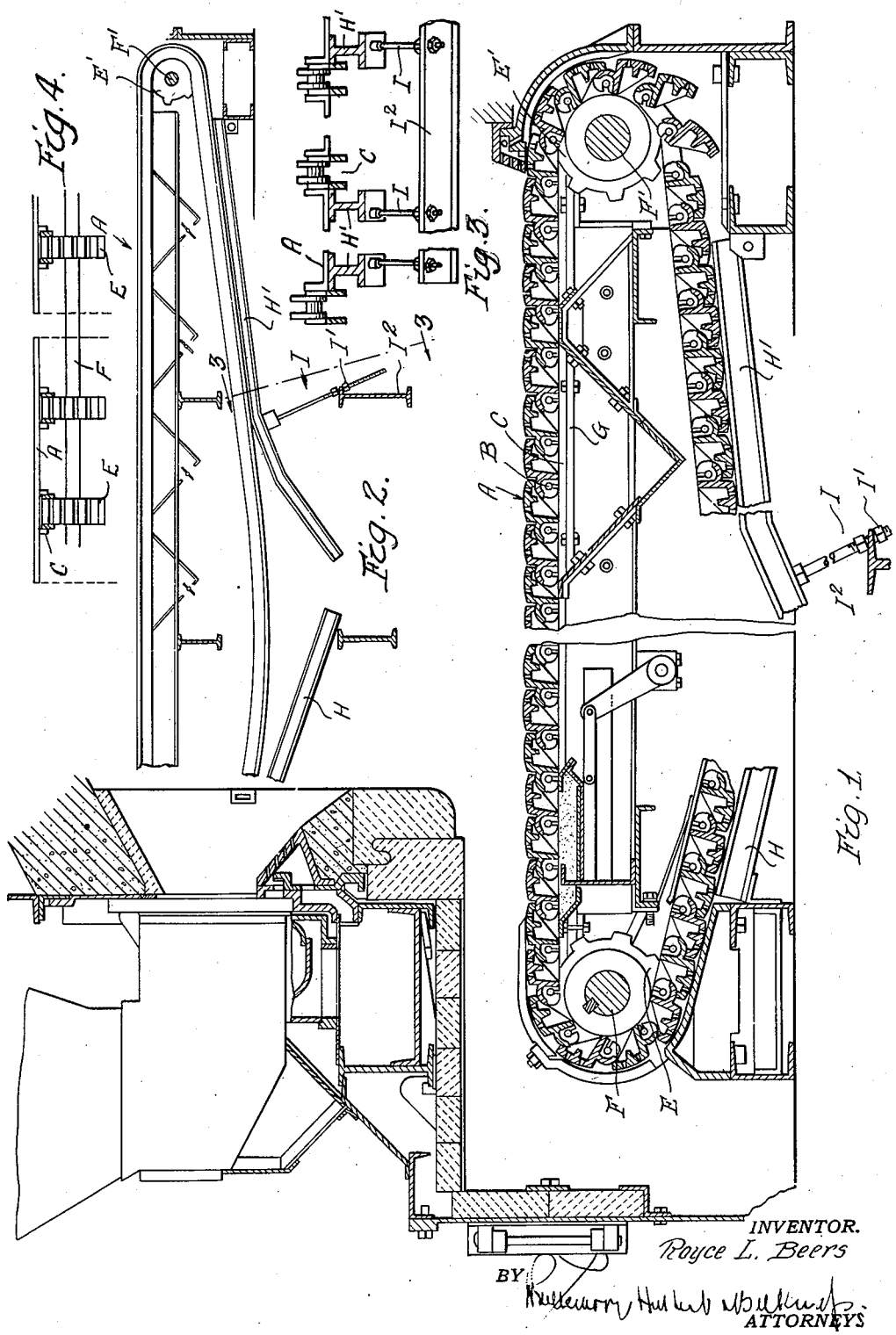

2,294,441

UNITED STATES PATENT OFFICE 2,294,441

CHAIN TAKE-UP MECHANISM FOR CHAIN GRATE STOKERS

Royce L. Beers, Birmingham, Mich., assignor to Detroit Stoker Company, Monroe, Mich., a corporation of Michigan Application July 17, 1940, Serial No. 346,048

7 Claims. (Cl. 110—40)

The invention relates to stokers employing a traveling chain grate, and forms a continuation in part of my former application bearing Serial No. 306,406, filed November 27, 1939. The instant application relates more particularly to the take-up means for the chain which compensates for any elongation thereof due to wear. To this end, the invention consists in the construction as hereinafter set forth.

In the drawing:

Figure 1 is a vertical longitudinal section through a chain grate to which my improvement is applied;

Figure 2 is a similar view illustrating the chain take-up mechanism;

Figure 3 is a section on line 3—3 of Figure 2; and

Figure 4 is a fragmentary plan view showing one of the shafts with the several sprockets mounted thereon.

The specific construction of the chain grate is not the subject matter of the instant invention, but in general it comprises a series of grate bars A, each of which is connected by pivots B to links C of an endless chain D. This chain passes around sprockets E and E' mounted on shafts F and F'. The upper portion of the chain is supported upon rails G which are overlapped by the opposite ends of each grate bar, said rails holding this portion of the chain in a horizontal plane. The lower or return portion of the chain is supported upon rails H and H' which support the greater part of the weight of the grate bars, thereby relieving stress on the chain and the sprockets.

In the operation of traveling grates there is a tendency for the chains to elongate due to wear or stretch, so that it is necessary to provide some means of compensation. This is usually accomplished by mounting the shaft for the sprockets at one end in adjustable bearings so that the distance between this shaft and the opposite shaft may be increased. I have, however, provided a simpler and better means of adjustment which permits of journaling both shafts in fixed bearings and with their axes spaced a fixed distance apart. This adjustment means comprises the arrangement of the rails H and H' at a slight angle to the horizontal, thereby permitting the sagging of the lower or return portion of the chain under its own weight. Furthermore, at least one of these rails, such as H', is adjustable in angularity, as for instance by means of a vertically adjustable link I engaging the inner end of the rail. Thus, where there is any elongation in the chain, it is merely necessary to adjust the link I downward, thereby permitting a greater sag in the return portion of the chain which will take up all lost motion. The link I is preferably threaded at its lower end to receive nuts I' which engage a fixed support I², and by adjusting these nuts the link is raised or lowered.

Where the furnace chamber is of considerable width, it is preferable to employ a plurality of parallelly arranged chain grates instead of a single chain grate extending the full width. My improved take-up means is particularly adapted for use with such multiple chain grate constructions, as it permits of independent adjustment of each unit. This is not possible where the adjustment means used is the shifting of the sprockets at one end of the grate for these sprockets must all be axially aligned and secured to the same shaft. However, with my improved construction the sprockets and their supporting shafts remain stationary, and a differential adjustment is secured by independently lowering the supporting rails H' of the several units.

As shown in Figure 2, the lower or return portion of the chain grate approximates a natural catenary curve, the portions supported on the rails H and H' being only slightly deflected from this curve, while the central portion intermediate the inner ends of the rails assumes the true catenary form. Thus, as the chain elongates, it is only necessary to slightly change the angle of one of the rails to still maintain the approximate catenary form. Also, the central portion of the grate, which is supported solely by the chains, will form an automatic take-up for a certain amount of increased slack due to wear, without the necessity of changing the angle of the rail. At the same time the portions supported on the inclined rails are of sufficient length to relieve the chains from overstressing.

It will be understood that the tension stress on the chain is reduced, due to the small length of the unsupported portion and also to the reduced friction by reason of the fact that a portion of the return pass of the chain is sliding down an incline. Consequently, the length of life of the grate is increased by this construction.

What I claim as my invention is:

1. In a stoker, a traveling grate comprising a chain, sprockets around which said chain passes, a series of grate bars pivotally attached to said chain, rails for slidably supporting in a fixed plane the bars attached to the upper portion of said chain, oppositely inclined rails for supporting the bars attached to the lower return portion of said chain to approximate a natural catenary curve, and means for adjusting the angle of one of said inclined rails to accommodate varying degrees of slack in said chain and to correspondingly change the catenary curve.

2. In a stoker, a traveling grate, comprising a chain, sprockets around which said chain passes, a series of grate bars pivotally attached to said chain, rails for slidably supporting in a fixed plane the bars attached to the upper portion of said chain, oppositely inclined rails for supporting the bars of the opposite end portions of the lower return portion of said chain to approximate a natural catenary curve, and means for vertically adjusting the inner end of one of said bars to change the angle of inclination thereof and to thereby take up slack.

3. In a stoker, a traveling grate, comprising a plurality of parallelly arranged independent chain grate units, sprockets around which all of said units pass having their axes in fixed relation to each other, oppositely inclined rails for independently supporting the lower or return portion of each of said units in approximately a natural catenary curve, and means for independently vertically adjusting the inner ends of rails in separate units to compensate for varying degrees of slack in the chains thereof.

4. In a stoker, the combination with a traveling chain grate and sprockets around which said grate passes having their axes in fixed relation to each other, of means for supporting the upper portion of said grate in a fixed plane, and means for supporting the lower return portion of said grate including supporting members inclining downward from opposite ends toward the center, leaving a central open space therebetween.

5. In a stoker, the combination with a traveling chain grate and sprockets around which said grate passes having their axes in fixed relation to each other, of means for supporting the upper portion of said grate in a fixed plane, means for supporting the lower return portion of said grate including supporting members inclining downward from opposite ends toward the center, leaving a central open space therebetween, and means for adjusting the inclination of one of said supporting members to accommodate varying degrees of slack.

6. In a stoker, a traveling grate comprising a plurality of parallelly arranged independent chain grate units, sprockets around which all of said units pass having their axes in fixed relation to each other, means for supporting the upper portion of said grate units in a fixed plane, oppositely inclined members for supporting the lower return portion of said chain grate units, and means for independently adjusting the inclination of one of the inclined members or each chain grate unit to take up varying degrees of slack.

7. In a stoker, a traveling grate comprising a plurality of independent parallelly arranged chain grate units, spaced sprockets around which each of said units passes, common shafts on which said sprockets of all of said units are mounted, the axes of said shafts remaining in fixed relation to each other, means for supporting the upper portion of said units in a common fixed plane, means for supporting the lower return portion of said units including members inclining downward from opposite ends toward the center, with an open space at the center, and means for independently adjusting the inclination of one of said members for each unit to take up varying amounts of slack.

ROYCE L. BEERS.